(No Model.)
G. GANDINI.
ELECTRIC ACCUMULATOR.
No. 480,575. Patented Aug. 9, 1892.
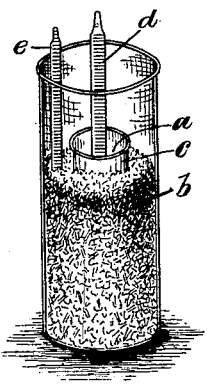

UNITED STATES PATENT OFFICE.

GIOVANNI GANDINI, OF LODI, ITALY.

ELECTRIC ACCUMULATOR.

SPECIFICATION forming part of Letters Patent No. 480,575, dated August 9, 1892.

Application filed April 15, 1891. Serial No. 389,227. (No model.) Patented in Italy February 14, 1891, LVII, 37.

*To all whom it may concern:*

Be it known that I, GIOVANNI GANDINI, professor, a subject of the King of Italy, and residing at Lodi, in the Kingdom of Italy, have invented certain new and useful Improvements in Electric Accumulators, (for which I have obtained patent in Italy, dated February 14, 1891, Vol. 57, No. 37,) of which the following is a specification.

This invention relates to electric accumulators, and it is illustrated in the accompanying drawing, to which reference is hereinafter made. An accumulator constructed according to the said invention has its two electrodes $a\ b$ formed of a mixture of lead oxide and small pieces of carbon. The two electrodes are separated by porous partitions $c$ of any suitable form. These porous partitions $c$, which may be either straight or curved, are made of any desired solid or gelatinous material capable of resisting the action of sulphuric acid. The electric current is collected on both sides of the partition by means of plates, strips, bars, rods, or other forms of conductors of lead, as $d\ e$, immersed in the mixture of lead oxide and pieces of carbon.

In the improved accumulator the straight or corrugated frame, pierced with holes or forming a trellis, which ordinarily serves to receive the active material, is entirely dispensed with. The addition of the pieces of carbon renders the electrodes more porous, accelerates the formation of the same, and increases the capacity of the active material relatively to its weight.

For constructing an accumulator according to the said invention the carbon (preferably coke or retort carbon) is reduced to small pieces and intimately mixed with lead oxide. With this mixture are filled one or more porous vessels containing each a plate or rod of lead. The porous vessel or vessels are introduced into an exterior receptacle containing the same mixture, in which is also immersed a plate or rod of lead. These conductors, as well as those placed in the aforesaid porous vessels, must establish a perfect electric contact with the surrounding material. On the top of the mixture, both interiorly and exteriorly of the porous vessels, is spread a thin layer of lead oxide, which may be renewed during the formation or the discharge of the accumulator. This top layer of lead oxide operates with respect to the negative electrode to prevent the pieces of carbon from floating on the surface of the liquid, and with respect to the positive electrode it operates to gradually increase the degree of compactness of the mixture as the formation of the electrode is progressing. The liquid used is, as usual, water acidulated with sulphuric acid.

What I claim is—

An electric accumulator comprising electrodes formed of a mixture of lead oxide and small pieces of carbon having a thin top layer of lead oxide, a porous partition separating said electrodes, and conductors immersed in the mixture constituting said electrodes, substantially as described.

GIOVANNI GANDINI.

Witnesses:
   OTTORINO LAZZARI,
   GIOVANNI SCURI.